United States Patent [19]
Nemec

[11] 3,795,392
[45] Mar. 5, 1974

[54] TORSIONAL ENERGY ABSORBER

[75] Inventor: John E. Nemec, Tallmadge, Ohio

[73] Assignee: The General Tire & Rubber Company, Akron, Ohio

[22] Filed: June 23, 1972

[21] Appl. No.: 265,917

[52] U.S. Cl............ 267/140, 267/141, 267/153, 267/154, 293/84, 293/85, 293/88
[51] Int. Cl....... B60g 11/22, B60r 19/06, F16f 1/46
[58] Field of Search..... 267/57.1 R, 63 A, 140, 141, 267/153, 154; 280/104.5 A; 293/1, 84, 85, 86, 88

[56] References Cited
UNITED STATES PATENTS

| | | | |
|---|---|---|---|
| 1,565,882 | 12/1925 | Adams | 293/86 |
| 1,633,901 | 6/1927 | Ohlendorf | 293/86 |
| 992,228 | 5/1911 | McGregor | 293/84 |
| 1,381,614 | 6/1921 | Baumgartl | 293/84 |
| 1,448,504 | 3/1923 | Plante | 293/84 |
| 1,619,087 | 3/1927 | Pampinella | 293/88 |
| 1,669,140 | 5/1928 | Ohlendorp | 293/84 |
| 1,704,995 | 3/1929 | Williams | 293/84 |
| 1,805,414 | 5/1931 | Ohlendorp | 293/84 |
| 2,226,435 | 12/1940 | Kolbe | 267/57.1 R X |
| 3,013,808 | 12/1961 | Willetts | 280/104.5 A |

Primary Examiner—Gerald M. Forlenza
Assistant Examiner—Howard Beltran

[57] ABSTRACT

A torsional energy absorber has inner and outer arm members connected by a pivot means. The pivot means has an outer tubular member fastened to the outer arm member, an inner member concentrically spaced apart from the outer member and fastened to the inner arm member, and an elastomeric member engagingly positioned between the inner and outer members, preferably under compression, to absorb energy on impact against the energy absorber by initially torqueing between the members and then slipping on the members. Preferably, the inner and outer members are cylindrical sleeves of like curvilinear cross-sections, and the elastomeric member is an annulus. In addition, it is preferred that a self-restoring means, such as a clutch assembly, be provided to restore the inner and outer members to original relative positions after impact.

4 Claims, 5 Drawing Figures

TORSIONAL ENERGY ABSORBER

FIELD OF THE INVENTION

The present invention relates to an energy absorbing impact assembly and particularly a high energy absorbing bushing assembly utilizing an elastomeric insert between a pair of rigid concentric sleeves.

BACKGROUND OF THE INVENTION

Energy absorbers have been known and used for many years. While many of these devices are utilized in a broad range of application, they have not found practical utility in automobiles. Recent attention has been focused upon protecting the automobile from physical damage which results from vehicular collision. Thus, it is proposed that automobiles be free from damage which might otherwise occur when a vehicle collides with an object at a predetermined speed and particularly at low speed, e.g. 5 mph. Such devices require high energy absorption without exceeding a maximum specified load, require an inexpensive and relatively small size package design, and involve a nominal deflection on impact.

One apprach to the problem of achieving a high energy absorption generally has been the use of a pair of members pivotally mounted between the impact member and the member to be protected. The pivot means of these devices includes such things as friction engaging plates, spring means, rubber members and the like to absorb the energy during the relative pivoting motion of the members. Illustrative of these devices include U.S. Pat. Nos. 992,228, 1,381,614, 1,448,504, 1,619,087, 1,669,140, 1,704,995 and 1,805,414. Such devices are particularly advantageous in their ability to withstand eccentric loading.

Absorbers utilizing pivotal absorption means have been made to absorb impact energy, but have not been found to have practical application in automobiles. The amount of energy such devices can absorb while restricting package size is below that needed for automotive applications. Conversely, where such devices are large enough to meet the energy absorption requirements, the device is not only too bulky and cumbersome, but requires loadings higher than can be practically tolerated with automobiles and the like.

The present invention overcomes these difficulties and disadvantages and provides an energy absorber utilizing elastomeric pivotal bushings which absorb large amounts of energy without exceeding a specified loading. Further, the device can be adapted to return to its original configuration without objectionable recoil and is an inexpensive device of small size.

SUMMARY OF THE INVENTION

An energy absorber of the present invention has inner and outer arm members connected by a pivot means. One of the arm assemblies is mounted, preferably pivotally, to a base such as an automobile frame or the like. The other arm members are preferably pivotally secured to an impact member such as an automobile bumper.

The pivot means is comprised of an outer tubular member fastened to the outer arm members and an inner member fastened to the inner arm members. The inner member is concentrically spaced away from the outer member. Engagingly positioned between the outer and inner members is an elastomeric member which is adapted to absorb energy on impact against the absorber by initially torqueing between the members and then slipping while under torsion on the members.

In the absorption of energy, the torsional stress-strain within the elastomeric member raises rapidly to a specific load value. The elastomeric member then slips on the inner and/or outer members absorbing energy at an optimum, substantially constant rate as the impact proceeds. In this way, large amounts of energy can be absorbed without exceeding a specified loading and with minimal deflection.

After impact, the energy absorber can be returned to its original configuration by external means for reuse. Preferably however, a self-restoring means such as a clutch mechanism is provided as part of the energy absorber to return the inner and outer arm members to their initial relative positions. In this way, the energy absorber can provide multi-impact characteristics without the added time and expense of reorienting the configuration of the absorber after each impact so that it can be reused.

Preferably the inner and outer members are cylindrical sleeve members for convenience and expense of manufacture. In this connection, the inner and outer members have like curvilinear cross-sections selected from the group consisting of circular and elliptic.

Other details, objects and advantages of the invention will become apparent as the following description of the present preferred embodiments and present preferred methods of practicing the same proceeds.

BRIEF DESCRIPTION OF THE DRAWINGS

In the accompanying drawings, the present preferred embodiments of the invention and present preferred methods of practicing the invention are illustrated in which.

DESCRIPTION OF THE PREFERRED EMBODIMENTS

Figure 1:
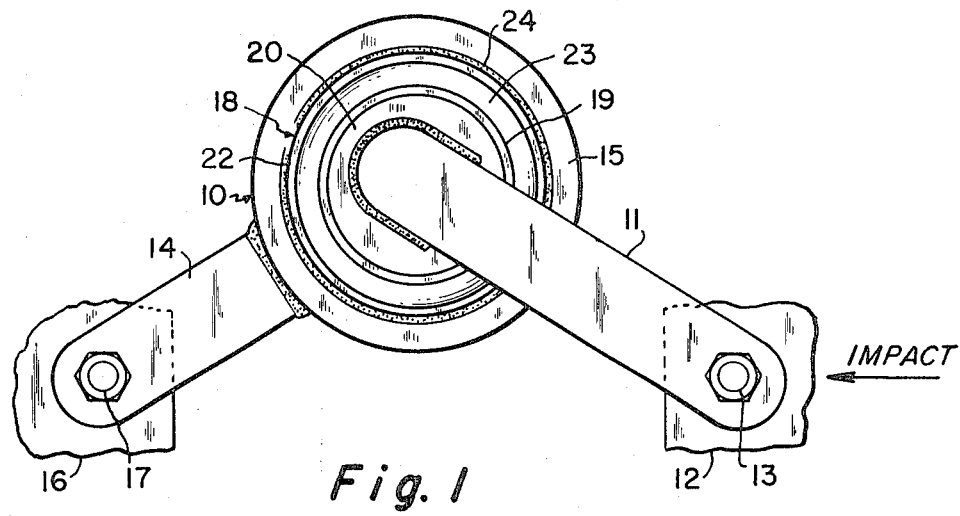
FIG. 1 is a plan view of an energy absorber utilizing an elastomeric bushing absorbing means.
Figure 2:
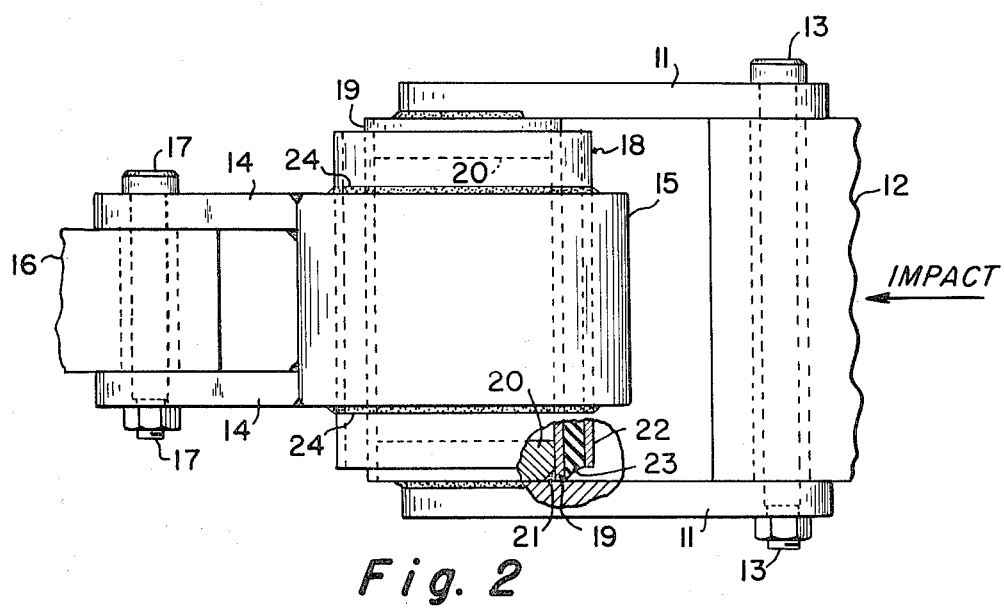
FIG. 2 is an elevation view with portions broken away of the energy absorber shown in FIG. 1.

Referring to FIGS. 1 and 2, energy absorber 10 has two inner arm members 11 and a clevis-shaped outer arm member 14 positioned relative to each other in an impact-free configuration. Inner arm members 11 have end portions pivotally mounted in a pair relationship to an impact member 12, such as an automobile bumper, by a bolt assembly 13. Outer arm member 14 has an annular housing 15 as the base of the clevis-shape. Outer arm member 14 has its bifurcated end portions of the clevis-shape pivotally mounted to a support member 16 such as an automobile frame by bolt assembly 17.

Inner arm and outer arm members 11 and 14 are connected by pivot means 18. Pivot means 18 comprises an inner cylindrical sleeve member 19 and outer cylindrical sleeve member 22. Sleeve member 22 is concentrically spaced away from and coaxially aligned with sleeve member 19. Engagingly positioned between members 19 and 22 is annular elastomeric member 23. Elastomeric member 23 is radially compressed between inner and outer members 19 and 22 by means well known in the art; see e.g. U.S. Pat. Nos. 2,660,780, 2,684,524, 2,690,001, 2,872,727 and 2,877,543.

Inner and outer members 19 and 22 are fastened to inner arm members 11 and outer arm member 14, respectively. Inner member 19 is fastened to arm members 11 by circular end plates 20 by welds, for example, at 21. End plates 20 are also fastened to inner arm members by any suitable means such as welding as shown. Outer member 22 is fastened to outer member 14 by concentrically engaging it within annular housing 15 and fastening it to housing 15 by suitable means such as welding at 24 as shown. The particular manner by which arm members 11 and 14 are fastened to inner and outer members 19 and 22 is a matter of choice and may be reversed. In other words, inner arm members 11 may be fastened to outer member 22 and outer arm member 14 may be fastened to inner member 19.

In operation, an impact imparted to impact member 12 causes inner arm members 11 to deflect toward outer arm member 14. The relative movement of these members 11 and 14 are restrained by pivot means 18 which absorbs the energy of the impact in the following way:

Inner and outer sleeve members 19 and 22 are caused to rotate relative to each other by reason of their rigid connections to inner and outer arm members 11 and 14, respectively. The relative movement of members 19 and 22 is permitted initially by torqueing of the elastomeric member 23 until the impact loading reaches a preselected maximum value and then by slipping while member 23 is under torsion on members 19 and/or 22.

The angle at which the torqueing is discontinued and slippage is commenced is called the slip angle. The slip angle is readily controlled by the hardness of the elastomeric member 23 and the extent of its compression between inner and outer members 19 and 22. The hardness and compression are in turn readily controlled by the composition of the elastomeric material and the dimensions of the elastomeric member relative to members 19 and 22 before its insertion between members 19 and 22. Typically the compositions of the elastomeric material is any vulcanizable or curable rubber having a Shore A hardness below about 85 and preferably above about 40. Typically the composition and compression of the elastomeric member 23 is the same as that used in elastomeric-metal bushings for mounting internal combustion engines and the like. The compression and hardness are preferably selected so that the slip angle is between about 20° and 25°.

After impact, the energy absorber 10 returns only part way to its initial configuration by reason of the torsional stresses within the elastomeric member 23. The energy absorbed by slippage is dissipated in the form of heat and is not available to restore the absorber to its original, impact-free configuration. Additional forces must therefor be applied to absorber 10 to return the arm members to their impact-free configuration for reuse.

Figure 3:
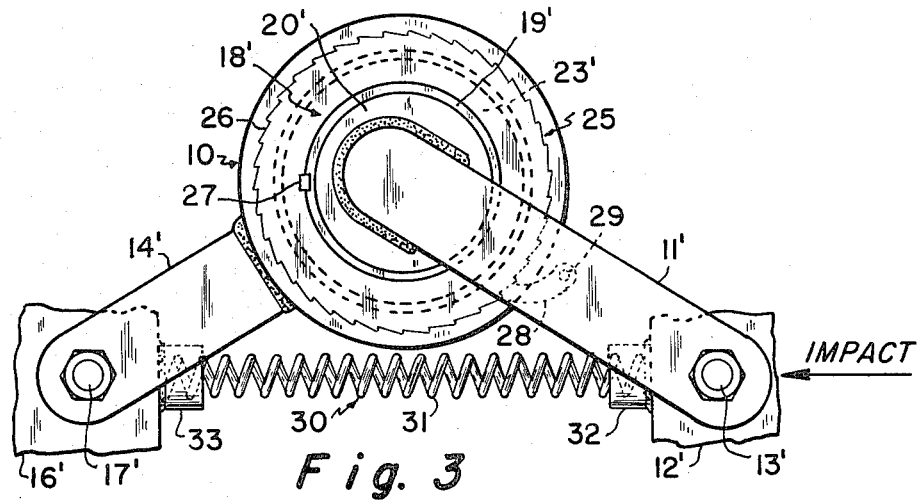
FIG. 3 is a plan view of a self-restoring energy absorber utilizing an elastomeric bushing absorber means.
Figure 4:
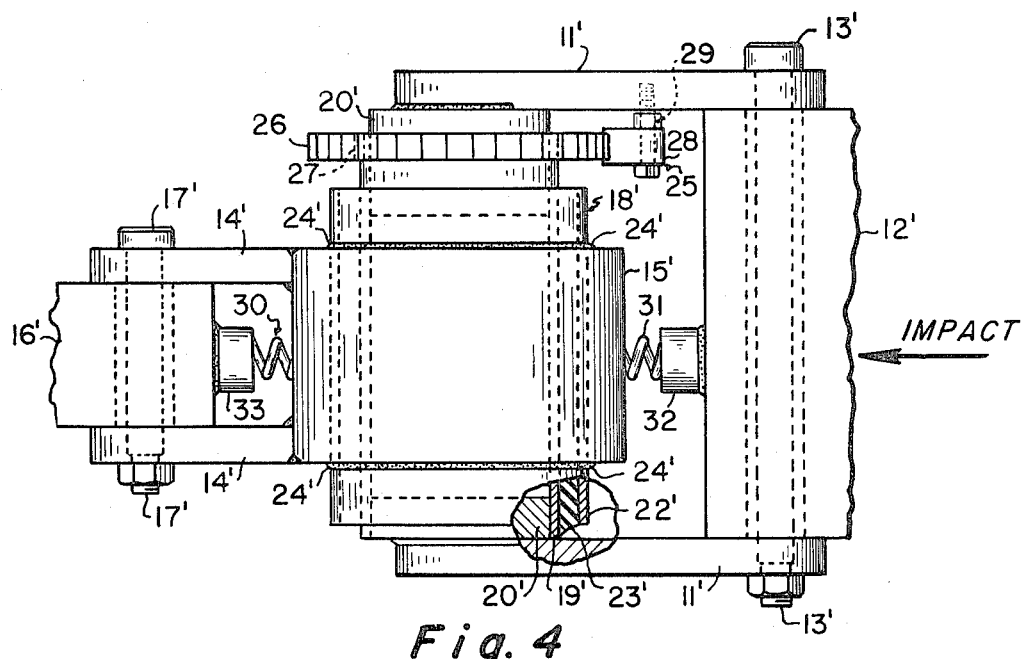
FIG. 4 is an elevation view with portions broken away of the energy absorber shown in FIG. 3.

Referring to FIGS. 3 and 4, a self-restoring embodiment of the energy absorber of the present invention is shown. The combination is the same as that shown in FIGS. 1 and 2 except for the elimination of welds between inner member 19' and end plates 20', the lengthening of inner member 19' as shown, and the additional elements hereinafter described. In this embodiment, circular end plates 20' are free to rotate within the cylindrical inner sleeve member 19'.

Assembly 25 provides a means for restoring arm members 11' and 12' to their relative, impact-free position after removal of the loading on the absorber. Assembly or self-restoring means 25 includes a ratchet wheel having teeth 26 rigidly and concentrically mounted to one of end portions of inner sleeve 19' by key 27. Pawl 28 is pivotally mounted to inner arm member 11' by pivot assembly 29. During impact, pawl 28 engages teeth 26 precluding rotation of inner sleeve 19' with respect to inner arm member 11'. Impact energy is thus absorbed by the relative rotation of inner sleeve 19' and outer sleeve 15' causing the elastomeric member 23' to initially undergo torsion and then slippage (while under torsion) between the respective sleeves.

After removal of the impact forces, pawl 28 permits inner sleeve 19' to freely rotate with respect to inner arm 11' to release the energy stored within elastomeric member 23'. By utilizing spring assembly 30 comprising spring 31 compressively engaged between member 12' and 16' in seats 32 and 33, respectively, inner arm 11' and outer arm 14' can be returned to their relative impact-free or unloaded position. Since inner arm 11' is free to rotate because of the relative position of pawl 28 with respect to teeth 26, little spring energy is required. Preferably, the spring constant of spring 31 is low such that during impact little energy is absorbed thereby.

To illustrate the invention, energy absorbers similar to the one shown and described in connection with FIGS. 1 and 2 were tested statically, and dynamically with a pendulum weight. Three energy absorbers were utilized, each capable of absorbing 15000 in-lbs. The inner diameter of the outer tubular members is 3 5/16 inches. The outer diameter of the inner tubular members is 2 ¾ inches. Axial lengths of the absorbers were 5 inches, 3 inches and 1 ½ inches respectively. Elastomeric members had a 70 Shore A durometer rating.

The results of the tests are set forth in Tables I and II below.

TABLE I

STATIC TESTS

| Axial Length of Absorber in Inches | Loading in pounds where slippage commenced | Deflection in inches at slippage |
|---|---|---|
| 5 | 5200 | None |
| 3 | 3180 | 1.6 |
| 3 | 3200 | 1.8 |
| 3 | 3350 | 1.7 |
| 1½ | 1700 | 1.6 |

The results show operability and repeatability with the slip load and slip angle repeating for the three test runs with the three inch absorber.

TABLE II.—DYNAMIC TESTS

| Axial length of absorber in inches | Impact load of absorber in lbs. | Energy absorbed by absorber in in.-lbs. | Peak load on absorber in in.-lbs. | Peak deflection of absorber in inches |
|---|---|---|---|---|
| 3 | 300 | 3,000 | 5,400 | 1.0 |
| 3 | 300 | 6,000 | 5,400 | 1.6 |
| 3 | 300 | 9,000 | 7,200 | 2.3 |
| 3 | 300 | 12,000 | 8,600 | 2.85 |
| 1½ | 300 | 3,000 | 2,500 | 1.55 |
| 1½ | 300 | 3,000 | 2,200 | 1.70 |
| 1½ | 300 | 3,000 | 2,400 | 1.65 |

Figure 5:
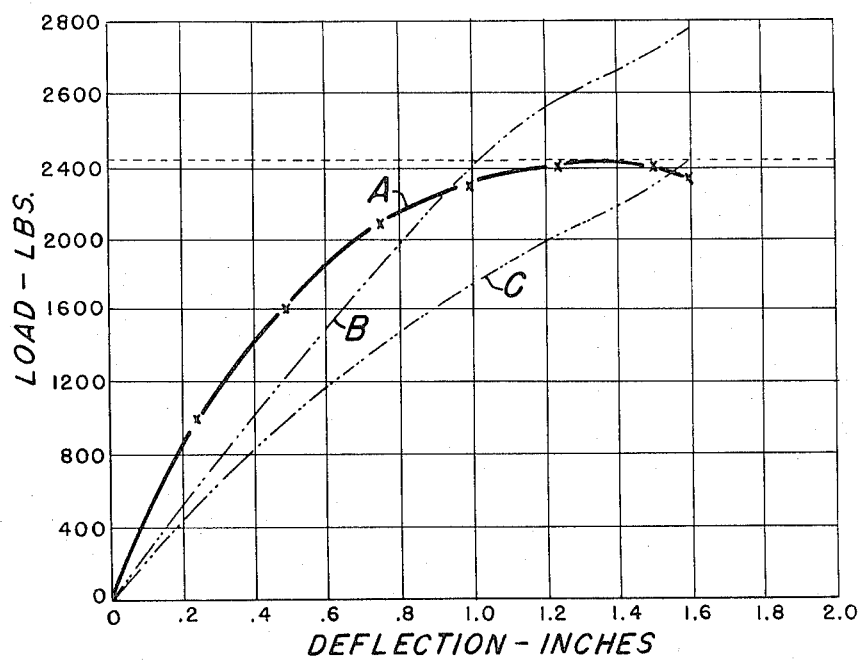
FIG. 5 is a graph showing the relationship of load to deflection of the energy absorber shown in FIGS. 1 and 2 and of prior art devices.

Curve A of FIG. 5 graphically represents the energy absorption characteristics of absorbers of the present invention. The area under Curve A represents the total energy absorbed by the absorber. As shown, a maximum load of about 2400 pounds is achieved. Because of the features above described, the load builds up rapidly to the maximum load and then makes a substantially smooth transition to a relatively constant load. This indicates the substantially constant force needed for slippage of the elastomeric member on the inner and/or outer sleeve members. Thus, energy is absorbed at a substantially constant rate during slippage.

Curves B and C of FIG. 5 are illustrative of the energy absorption characteristics of comparable prior art absorbers. Curve B illustrates absorption by a prior device of the same total energy as Curve A. As shown, the prior device requires a peak load of about 2800 pounds to obtain the same energy absorption in the same deflection. In addition, a larger and heavier structure is required to withstand the higher loading. Conversely, as shown by Curve C, a comparable prior device which does not exceed the predetermined load of about 2400 pounds absorbs much less energy on impact for a given deflection.

While presently preferred embodiments have been shown and described with particularity, it is distinctly understood that the invention may be otherwise variously performed within the scope of the following claims.

What is claimed is:

1. An energy absorber comprising:
    A. outer arm members,
    B. inner arm members,
    C. a pivot means connecting said outer arm members to said inner arm members, said pivot means having
        1. a tubular, rigid, outer sleeve secured to said outer arm members,
        2. a tubular, rigid, inner sleeve disposed coaxially with and radially inwardly of said outer sleeve and secured to said inner arm members,
        3. an elastomeric annulus radially compressed between said inner and outer sleeves and adapted upon impact to torque between said sleeves upon relative rotation between said sleeves about their axis up to a preselected angle and slip on said sleeves upon relative rotation between said sleeves about their axis of an angle in excess of said preselected angle.

2. An energy absorber as set forth in claim 1 comprising in addition:
    d. self-restoring means for restoring the outer and inner arm members to their original relative positions after impact.

3. An energy absorber as set forth in claim 2 wherein:

the self-restoring means is a clutch assembly.

4. An energy absorber as set forth in claim 1 wherein:

the inner and outer sleeves have like curvilinear cross-sectional shapes selected from the group consisting of circular and elliptic.

\* \* \* \* \*